United States Patent Office 2,962,423
Patented Nov. 29, 1960

2,962,423
PROCESS FOR THE 1-HYDROXYLATION OF STEROIDS BY MORTIERELLA

Louis I. Feldman, Spring Valley, N.Y., Neil E. Rigler, Ridgewood, N.J., and Anthony J. Shay, Pearl River, N.Y., assignors to American Cyanamid Company, New York, N.Y., a corporation of Maine No Drawing. Filed Jan. 2, 1959, Ser. No. 784,448

8 Claims. (Cl. 195—51)

This invention relates to the preparation of 1-hydroxylated-9α-halo steroids of the pregnane series. More particularly, it relates to the microbiological 1-hydroxylation of 9α-halo steroids of the pregnane series by the genus Mortierella.

The use of triamcinolone, 9α-fluoro-16α-hydroxyprednisolone, as an anti-arthritic and in dermatology is well known and widely accepted. Improved methods of preparing this steroid are therefore highly desirable.

We have now found that intermediates convertible in a matter of two or three steps to triamcinolone can be prepared, for example, from readily available steroids such as 9α-fluoro hydrocortisone.

The process of the present invention can use as starting material practically any steriod of the pregnene series having in the 1-position two hydrogen atoms attached to the carbon atom and in the 9-position a halogen atom. Among these compounds can be, for example, 9α-fluorohydrocortisone, 9α-bromohydrocortisone, 21-acetoxy-9α-bromohydrocortisone, 9α-fluorocortisone, 9α-bromocortisone, 21-acetoxy-9α-fluorocortisone, 21 - acetoxy - 9α-bromocortisone, 9α-fluoro-11β,21 - dihydroxy - 4,16 - pregnadiene-3,20 - dione, 9α - bromo-11β,17α,21-trihydroxy-4,16-pregnadiene - 3,20 - dione, 21-acetoxy - 9α - fluoro-11β,21-dihydroxy - 4,16 - pregnadiene-3,20-dione, 21-acetoxy-9α-bromo-11β,21 - dihydroxy - 4,16 - pregnadiene-3,20-dione, 9α - fluoro-11β,16α,17α,21 - tetrahydroxy - 4 - pregnene-3,20 - dione, 9α - bromo-11β,16α,17α,21 - tetrahydroxy-4-pregnene-3,20 - dione, 21-acetoxy - 9α-fluoro-11β,16α,17α-trihydroxy - 4 - pregnene - 3,20 - dione, 21 - acetoxy - 9α-bromo-11β,16α,17-trihydroxy - 4 - pregnene - 3,20 - dione, and the like.

In carrying out the process of the present invention, species of the genus Mortierella such as bainieri, polycephala, candelabrum, alpina, tuberosa, pusilla, isabellina, and maeburgensis or other species of Mortierella such as Mortierella zonata ATCC No. 13,309 are cultivated aerobically in a suitable nutrient medium with a 9α-halo steriod of the pregnane series. Mortierella zonata has the following characteristics; culture on potato-dextrose agar spreading rapidly and covering the entire Petri dish in 10 days; aerial mycelium white, cottony; up to 4–5 mm. high, forming concentric zonations; sporophores simple, rarely showing branching; 75–200μ x 4–5μ at base, 2–3μ at tips. Stylospores produced at the terminus of the sporophores; spores globose, 8–16μ in diameter; walls appearing slightly roughened; cultures on cornmeal agar growing thinly (less than 1 mm. high) with wide submerged advancing colony margin. Colonies 6–7 cm. in diameter in ten days, zonate and feathery appearing; sporiferous structures produced mostly in central zones, and more abundantly than on potato-dextrose agar, but with similar dimensions. These species are described in detail by J. C. Gilman, "A Manual of Soil Fungi," 2nd edition, Iowa State College Press, 1957; also by C. W. Hesseltine unpublished thesis, University of Wisconsin, 1950. Fungi of the class Phycomycetes, order Mucorales and the various genuses are available from culture collection agencies such as American Type Culture Collection, Washington, D.C.; Northern Regional Research Laboratories, Peoria, Illinois; The Imperial Institute of Mycology, Kew, England; The Central Bureau voor Schimmel Culture, Baarn, Holland, and so forth. The species Mortierella polycephala, M. candalabrum and M. alpina are available from Centraalbureau voor Schimmelcultures (CBS), Baarn, Holland, described on pages 93 and 94, List of Cultures, 1957. During the growth of the organism under favorable conditions, a hydrogen atom in the 1-position is replaced with a hydroxyl radical.

The exact mechanism of this hydroxylation is obscure, but it is the result of enzymes produced by the organism in the process of the growth. A suitable nutrient medium contains a soluble source of carbon, nitrogen, and mineral elements. Sources of carbon include sugars, such as glucose, sucrose, maltose, dextrose, xylose, and galactose; also, alcohols, such as glycerol or mannitol; corn starch; organic acids, such as citric acid, malic acid, and acetic acid; and various natural products containing carbohydrates, such as corn steep liquor, soybean meal, cotton seed meal, and many other available materials which have been used heretofore as a source of carbon in fermentation processes. Usually a variety of the above can be employed in the medium with good results.

Suitable sources of nitrogen include some of the above-named materials, such as corn steep liquor, soybean meal, cotton seed meal, and the like, and various other substances, such as beef extract, casein, yeast, enzymatically digested proteins, and degradation products, including peptones, amino acids, and many other available proteinaceous materials which have been found to be suitable in supporting the growth of fungi. Inorganic sources of nitrogen, including urea, ammonium salts, nitrates, and the like, may be used in the medium as a source of assimilable nitrogen to provide a favorable growth medium for the organism.

The mineral requirements of fermentation are usually supplied in the crude materials which are often used as sources of carbon and nitrogen or occur in water that is used in the process. However, it is usually advisable to supplement the minerals normally present with added amounts to obtain a maximum growth of Mortierella. Cations and anions which may be desirable in added amounts include sodium, potassium, calcium, magnesium, phosphate, sulphate, chloride, cobalt, manganese, and various others. The use of trace elements, such as boron, copper, cobalt, molybdenum, and chromium, is often desirable.

The growth of the Mortierella fungus takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ⅓ to 2 volumes of air per volume of medium per minute. Agitation in the bottles or fermenter tanks is provided by a mechanical impeller. The Mortierella fungus will grow at temperatures between 10° and 45° C., but it is preferable to carry out the process using the same at a temperature of from 20° to 35° C.

To prepare the fermentation medium for bottle fermentation, 1.0 ml. of washed vegetative cell suspension of fungi of the genus Mortierella from a potato dextrose agar slant is used to inoculate 100 ml. of sterile medium containing 2% molasses, 1% corn steep liquor, 1% corn starch and pH adjusted to about 7.0. The fermentation time may vary from about 75 to about 125 hours.

A preferred method of adding the substrate is to dissolve the steroid in ethanol, methanol, or other water-miscible solvents and add it to the fermentation medium at the desired stage in the process. Although the steroid may precipitate from solution when so added, it is dispersed throughout the medium as a fine suspension and becomes readily available to the organism for hydroxylation. The amount of steroid added to the fermentation may vary considerably, but it is generally on the order of 0.1 to 1.0 gram per liter of medium.

During the fermentation process, it may be desirable to add antifoaming agents, such as silicones, glyceride oils, and the like. These compounds are added from time to time and in the amounts needed.

In the process of the present invention using shaker tubes, the 10 ml. batches of inoculated medium in 100 ml. shaker tubes are usually incubated for a period of about 20 to 50 hours at a temperature of about 28° C. At this point, 2 mgm. of sterile substrate (9α-halo steroid) dissolved in 0.2 ml. of methanol is added to each tube and the fermentation continued at about 28° C. The fermentation is allowed to proceed for a period of time long enough to achieve maximum conversion of the 9α-halo steroid to the 1-hydroxyl-9α-halo steroid. This period of time may vary from 1 to 125 hours or longer.

At the conclusion of the fermentation process, the desired 1-hydroxyl-9α-halo steroid is recovered from the fermentation medium by the following procedure which describes in particular a 10 ml. fermentation. This is a general procedure and is operative for fermentations of various sizes.

The contents of a fermentation tube are extracted two times with two volumes each time of methylene chloride. The extracts are pooled and the resulting solution evaporated to dryness under reduced pressure. The dried residue is dissolved in methanol. This solution is used for characterization of steroid content as described hereinafter.

In large-scale fermentations, the crude product or products may be recovered from the fermentation beer by simple solvent extraction, using a suitable water-immiscible solvent, such as chlorinated lower hydrocarbons, alcohols, esters, ketones, and so forth. Further purification and separation of steroid products from extracts may be accomplished by methods well understood by those skilled in the art. Separation and purification of steroid mixtures often require the use of chromatography, as described hereinafter in the examples.

The following examples describe in detail the preparation of 1-hydroxy-9α-halo steroids of the pregnane series using species of the genus Mortierella.

Example 1

Twenty-four liters of fermentation medium consisting of 2% molasses, 1% corn steep liquor and 1% corn starch is prepared and inoculated with *Mortierella zonata* (ATCC 13,309). Six grams of the substrate 9α-fluorohydrocortisone dissolved in 120 ml. of methanol is added and the fermentation continued for 125 hours. The mash is filtered with the aid of diatomaceous earth yielding 21 liters of beer. The filter-aid mash cake is extracted with 2.1 liters of ethyl acetate and the extracted cake discarded. The beer is extracted twice with 21 liters of ethyl acetate in each extraction. The three extracts are pooled and concentrated to a residue under reduced pressure yielding 3.87 g. of crude crystals. The crystals are chromatographed on a 650 g. diatomaceous earth column with a system consisting of 1 volume of water, 5 volumes dioxane, and 2 volumes of cyclohexane. At a holdback volume of 1.7 a peak is obtained which when concentrated to dryness and recrystallized from acetone yields 31.4 mg. of material having identical infra-red, ultra-violet and $R_f$ values for 1-hydroxy-9α-fluoro-hydrocortisone as prepared by a different method.

Example 2

A twenty-four liter quantity of fermentation medium consisting of 2% molasses, 1% corn steep liquor, and 1% corn starch is prepared and inoculated with *Mortierella zonata*. Six grams of the substrate 9α-fluorohydrocortisone dissolved in 120 ml. of methanol is added and the fermentation continued for about 125 hours. The mash is filtered with the aid of diatomaceous earth yielding 21 liters of beer. The beer is extracted with three separate 21 liter extractions with methyl isobutyl ketone. The three extracts are pooled and concentrated to a residue. The residue is chromatographed on a 650 g. diatomaceous earth column using a system consisting of 1 volume of water, 5 volumes of dioxane and 3 volumes of cyclohexane. At a holdback volume of 3.5 liters, a peak is obtained which when concentrated to dryness and recrystallized twice from acetone gives 120 ml. of product. The product has identical infra-red, ultra-violet and $R_f$ values for 1-hydroxy-9α-fluoro-hydrocortisone with the same product prepared by a different method.

Example 3

In a process similar to that of Example 1 except that *Mortierella polycephala* is used in place of *Mortierella zonata*. The product obtained is 1-hydroxy-9α-fluorohydrocortisone.

Example 4

An experiment is carried out similar to Example 1 except that 9α-fluoro-hydrocortisone is replaced with 9α-fluoro - 11β,16α,17α,21 - tetrahydroxy-4-pregnene-3,20-dione. The product obtained is 9α-fluoro-1,11β,16α,17α,21-pentahydroxy-4-pregnene-3,20-dione.

Example 5

Following the procedure of Example 2 and substituting *Mortierella candelabrum* in place of *Mortierella zonata*. The product obtained was 1-hydroxy-9α-fluoro-hydrocortisone which was identical with the same product prepared by a dfferent method.

Example 6

Using the process outlined in Example 1 and substituting *Mortierella alpina* in place of *Mortierella zonata*, the product 1-hydroxy-9α-fluoro-hydrocortisone is obtained.

Example 7

In a process as outlined in Example 1 in which *Mortierella tuberosa*, *Mortierella pusilla van isobellina*, *Mortierella bainieri* and *Mortierella marburgensis* are substituted for *Mortierella zonata*. The product obtained is 1-hydroxy-9α-fluoro-hydrocortisone.

Example 8

In a process similar to that outlined in Example 1, eighteen Mortierella species isolated from different sources at different times, produced 1-hydroxy-9α-fluoro-hydrocortisone, when fermented with 9α-fluorohydrocortisone.

Example 9

To 100 mg. of 1-hydroxy-9α-fluorohydrocortisone is added 10 ml. of acetic acid and the solution refluxed for 1 hour. The acetic acid is removed by distillation under reduced pressure and the residue chromatographed in a partition column as described in Example 1, except that in this instance, 56 g. of diatomaceous earth is used with a system composed of 1 volume of water, 5 volumes of dioxane and 4 volumes of cyclohexane. A peak is obtained at a holdback volume of 3.7 which is concentrated to crystals. These crystals are recrystallized twice from acetone to give 13 mg. of a product characterized by elemental analysis, infra-red spectrum and melting point data as identical with those of $\Delta^1$-9α-fluoro-hydrocortisone derived by microbiological dehydrogenation of 9α-fluoro-hydrocortisone.

We claim:

1. A process of hydroxylating 9-halo steroids of the pregnane series in the 1-position which comprises the step of subjecting said 9-halo steroid of the pregnane series to the fermentative action of a fungus of the genus Mortierella.

2. A process which comprises the step of subjecting a 9α-halo-hydrocortisone to the fermentative enzymatic action of fungi of the genus Mortierella and recovering therefrom a 1-hydroxy-9-halo-hydrocortisone.

3. A process which comprises the step of subjecting 9α-fluoro-hydrocortisone to the fermentative enzymatic action of fungi of the genus Mortierella and recovering therefrom 1-hydroxy-9α-fluoro-hydrocortisone.

4. A process which comprises the step of inoculating the nutrient medium with the fungus Mortierella zonata and adding 9α-fluoro-hydrocortisone permitting fermentation to proceed until a substantial amount of 1-hydroxy-9α-fluoro-hydrocortisone has been produced and recovering said product therefrom.

5. A process which comprises the steps of inoculating a nutrient medium with the fungus Mortierella polycephala and adding 9α-fluoro-hydrocortisone permitting the fermentation to proceed until a substantial amount of 1-hydroxy-9α-fluoro-hydrocortisone is produced and recovering said compound therefrom.

6. A method which comprises the step of subjecting 9α-fluoro-hydrocortisone to the enzymatic action of the fungus Mortierella candelabrum and recovering therefrom 1-hydroxy-9α-fluoro-hydrocortisone.

7. A process which comprises the step of subjecting 9α-fluoro-11β,16α,17α,21-tetrahydroxy-4-pregnene - 3,20-dione to the enzymatic action of the fungus Mortierella zonata and recovering therefrom 9α-fluoro-1,11β,16α,17α,21-pentahydroxy-4-pregnene-3,20-dione.

8. A process which comprises the step of subjecting 9α-fluoro-hydrocortisone to the enzymatic action of the fungus Mortierella alpina and recovering therefrom 1-hydroxy-9α-fluoro-hydrocortisone.

References Cited in the file of this patent

UNITED STATES PATENTS 2,602,769    Murray et al. _____ July 8, 1952

OTHER REFERENCES

Mininger et al.: Arch. Biochem. and Biophysics, 60 (1956), pp. 427–432.